United States Patent [19]

Brown et al.

[11] 3,888,816
[45] June 10, 1975

[54] PROCESS FOR PRODUCING BOUND AGGREGATE BUILDING MATERIAL

[75] Inventors: Lloyd H. Brown, Crystal Lake; Daniel S. P. Eftax, Barrington, both of Ill.

[73] Assignee: The Quaker Oats Company, Chicago, Ill.

[22] Filed: June 18, 1973

[21] Appl. No.: 371,067

Related U.S. Application Data

[63] Continuation-in-part of Ser. No. 112,487, Feb. 3, 1971, abandoned.

[52] U.S. Cl. ............................. 260/39 R; 260/88.5
[51] Int. Cl. ............................................. C08g 51/04
[58] Field of Search ............ 260/88.5, 39 R; 164/43

[56] References Cited
UNITED STATES PATENTS

| | | | |
|---|---|---|---|
| 2,768,408 | 10/1956 | Strigle et al. | 260/88.5 |
| 3,205,191 | 9/1965 | Watson et al. | 260/37 R |
| 3,331,885 | 7/1967 | Rider et al. | 260/826 |
| 3,639,654 | 2/1972 | Robins | 260/37 R |
| 3,734,936 | 5/1973 | Brown et al. | 260/37 R X |
| 3,738,955 | 6/1973 | Bozer et al. | 260/39 R |

Primary Examiner—Donald E. Czaja
Assistant Examiner—S. M. Person
Attorney, Agent, or Firm—Joseph P. O'Halloran

[57] ABSTRACT

A process for producing a bound aggregate building material composition comprising: (a) forming a monomeric binder mixture of specified amounts of monomeric furfuryl alcohol and a silane coupling agent of the general formula:

$$X-R'-Si(OR'')_3$$

wherein $R'$ is a short chain alkylene radical; $R''$ is aryl, substituted aryl, alkyl, or heteroalkyl; and $X$ is amino, mercapto, epoxy, or glycidoxy; (b) forming a mixture of specified amounts of aggregate and acidic catalyst; (c) admixing specified amounts of the monomeric binder with specified amounts of the aggregate-acidic catalyst mixture.

16 Claims, No Drawings

PROCESS FOR PRODUCING BOUND AGGREGATE BUILDING MATERIAL

CROSS-REFERENCE TO RELATED APPLICATION

This application is a continuation-in-part of application Ser. No. 112,487, filed Feb. 3, 1971 and now abandoned.

BACKGROUND OF THE INVENTION

1. Field of the Invention

This invention relates to a bound aggregate building material composition and in particular to a process for producing the composition.

2. Description of the Prior Art

Perhaps the most common building material composition is concrete prepared by binding aggregate with Portland cement. This standard building material, however, has several deficiencies. Included among these deficiencies is that of curing since it normally takes about 28 days to achieve a suitable cure in Portland cement. Another problem associated with Portland cement is that it is not substantially chemically resistant to acids. Still another problem associated with Portland cement is that it does not have good tensile strength. Also, it is not particularly outstanding in flexural strength. There is, therefore, a need for a building material composition which can overcome the problems associated with Portland cement prepared concrete.

Several attempts have been made to produce building material compositions that will overcome the above-described problems. Among these are the preparation of furan plastics by a mixture of furfuryl alcohol polymer with plaster of paris. Other attempts include the use of polymeric resins in admixture with the Portland cement. Still other attempts include the use of polymerized resins as coating materials for Portland cement. Still further attempts have included furfuryl alcohol resins or polymerized furfuryl alcohol as an ingredient with an aggregate mixture. None of these previous methods have adequately provided all the properties desired in a building material. Prior known materials usually sacrifice one property such as strength for another property such as acid resistance or vice versa.

This invention provides a new and novel process which overcomes many of the problems and difficulties associated with the prior art.

SUMMARY OF THE INVENTION

It is an object of this invention to produce a building material composition that has improved compressive and tensile strengths.

It is another object of this invention to produce a bound aggregate building material composition that cures rapidly in relation to Portland cement.

It is still another object of this invention to provide a bound aggregate building material composition that has high acid resistance.

The objects of this invention are accomplished by a process for producing a bound aggregate building material composition comprising the steps of:

a. forming a first mixture comprising a monomeric binder mixture of from 99.5 percent by weight to 99.9875 percent by weight furfuryl alcohol monomer and from 0.0125 percent to 0.5 percent by weight of a silane coupling agent of the general formula:

$$X-R'-Si(OR'')_3$$

wherein R' is a short chain alkylene containing between about 3 and 6 carbon atoms; R'' is a radical selected from the group consisting of aryl, alkyl, substituted aryl, and heteroalkyl; and X is a reactive member selected from the group consisting of amino, mercapto, epoxy, and glycidoxy;

b. forming a second mixture comprising a mixture of aggregate and acidic catalyst, said aggregate and said acidic catalyst being mixed in a proportion such that when from 2 percent to 20 percent by weight first mixture is admixed with from 80 percent to 98 percent by weight of the aggregate-acidic catalyst mixture, the acidic catalyst is present in an amount of from 5 percent to 50 percent by weight of the monomeric binder; and c. admixing said first mixture and said second mixture in an amount such that the first mixture contributes from 2 percent to 20 percent by weight and said second mixture contributes from 80 percent to 98 percent by weight.

Although it is not required, it is sometimes desirable to include from 2 percent to 10 percent by weight of aqueous urea-formaldehyde mixture in the aforesaid first mixture, based on the weight of said first mixture.

The optional aqueous urea-formaldehyde mixtures are sold in commerce. One example in "U.F. Concentrate-85" sold by Nitrogen Division of Allied Chemical & Dye Corporation, South Point, Ohio. Another aqueous urea-formaldehyde mixture is made by E. I. du Pont de Nemours and Company, Wilmington, Delaware, and is marketed as "Urea-Formaldehyde 25–60." Other examples of aqueous urea-formaldehyde mixtures are "Sta-Form 60" by Georgia-Pacific Company, Portland, Oregon, "UF–85" and "UF–78" by Borden Chemical Division, Borden, Inc., New York, New York, "Agrimine" by Reichhold Chemical, Inc., White Plains, New York, "Formourea 60" by Montecatini Edision of Italy, and "Formol 55" by Badische Anilin- & Soda-Fabrick of Germany. The formaldehyde, urea, and equilibrium reaction products thereof, present in aqueous urea-formaldehyde mixtures are believed to exist in equilibria as follows:

$NH_2CONH_2 + HCHO \rightleftharpoons NH_2CONHCH_2OH$ $NH_2CONHCH_2OH + HCHO \rightleftharpoons HOCH_2NHCONHCH_2OH$ $HOCH_2NHCONHCH_2OH + HCHO \rightleftharpoons HOCH_2NHCON(CH_2OH)_2$ $HOCH_2NHCON(CH_2OH)_2 + HCHO \rightleftharpoons (HOCH_2)_2NCON(CH_2OH)_2$ The above equilibria illustrate what is meant by the phrase "a non-polymerized aqueous mixture of formaldehyde, urea, and equilibrium reaction products thereof," which is herein claimed as an aqueous urea-formaldehyde mixture. Those urea molecules in the equilibria shown above that have more than one methylol radical attached are sometimes referred to as polymethylol ureas. There is difficulty encountered in distinguishing between the different polymethylol ureas in the aqueous urea-formaldehyde mixtures. For this reason the composition of the aqueous urea-formaldehyde solution is reported in terms of the weight percent urea and formaldehyde. A typical analysis of Allied Chemical's aqueous urea-formaldehyde mixture ("U.F. Concentrate-85") shows 59 percent by weight formaldehyde, 26 percent by weight urea, and about 15 percent by weight water.

The aqueous urea-formaldehyde mixture hereinbefore described may contain from about 5 percent to about 25 percent by weight water.

It is to be noted that the aqueous urea-formaldehyde mixture as described herein can optionally be present in an amount of from 2 percent to 10 percent by weight. At the upper concentration of aqueous urea-formaldehyde, i.e. 10 percent and above, the concentration of free formaldehyde begins to create a formaldehyde odor that makes the binder unacceptable due to personnel exposure. This invention, therefore, makes use of the aqueous urea-formaldehyde mixture without presenting the serious problems normally associated with the use of formaldehyde.

While we prefer to use gamma-aminopropyltriethoxysilane, other examples of the silane coupling agents used in this example include for example the following:
gamma-mercaptopropyltrimethoxysilane;
N-beta-(aminoethyl)-gamma-aminopropyltrimethoxysilane;
beta-(3,4-epoxycyclohexyl)ethyltrimethoxysilane;
gamma-glycidoxypropyltrimethoxysilane;
gamma-aminopropyltriphenoxysilane;
gamma-aminopropyltribenzoyloxysilane;
gamma-aminopropyltrifurfuroxysilane;
gamma-aminopropyltri(o-chlorophenoxy)silane;
gamma-aminopropyltri(p-chlorophenoxy)silane; and
gamma-aminopropyltri(tetrahydrofurfuroxy)silane.

The monomeric binder mixture of this invention also includes from 99.5 percent to 99.9875 percent by weight furfuryl alcohol. It is to be emphasized that the furfuryl alcohol must be monomeric as opposed to polymerized furfuryl alcohol, furfuryl alcohol resins, or condensed furfuryl alcohol. It must also be emphasized that the binder mixture of this invention be monomeric and not contain substantial quantities of polymerized ingredients.

However, it is to be understood that the aforesaid "first mixture" which includes the "binder mixture" can include urea-formaldehyde, and water, as well as non-deleterious amounts of impurities present in the commercially available raw materials, such as, for example, the non-deleterious impurities normally present in commercially available furfuryl alcohol. It is to be understood that these impurities may not include substantial quantity of polymerized furfuryl alcohol.

This invention includes forming a mixture of aggregate and acidic catalyst to be mixed with the monomeric binder mixture. The acidic catalyst must be mixed with the aggregate in a proportion such that when 2 percent to 20 percent by weight monomeric binder is mixed with from 80 percent to 98 percent by weight of the aggregate-acidic catalyst mixture, the acidic catalyst is present in an amount of from 5 percent to 50 percent by weight of the monomeric binder.

The building material composition of this invention comprises a bound aggregate. Generally, an aggregate may be said to be grains of mineral matter that exceed about 0.01 mm. in diameter, and thus an aggregate may be taken to be divided mineral matter which does not have a major portion of its content comprising particles having a diameter smaller than 0.01 mm. The term "aggregate" therefore includes the use of mineral part of which may be under the standard definition of "sand" but also having particles which may be larger than that normally used to define "sand," such as, for example, gravel.

This invention includes the admixing of the aggregate with an acidic catalyst. Generally, any acidic catalyst may be employed, e.g. toluene sulfonic acid, phosphoric acid, ammonium chloride, ammonium trichloroacetate, ammonium phosphate, ammonium sulfate and ammonium nitrate. A solution of 70 percent toluene sulfonic acid in water and an 85 percent solution of phosphoric acid in water are particularly well adapted for use as a catalyst in this invention.

In practicing this invention the aforesaid first mixture comprising the monomeric binder mixture is first prepared by admixing the components as hereinbefore described. Also, the aggregate and acidic catalyst are prepared in the proportions hereinbefore described. Next, the monomeric binder is admixed with the aggregate-acidic catalyst mixture. In this admixture the first mixture constitutes from 2 percent to 20 percent by weight of the mixture while the aggregate-acidic catalyst mixture constitutes the remaining 80 percent to 98 percent by weight of the admixture.

DESCRIPTION OF THE PREFERRED EMBODIMENTS

This invention will further illustrated but is not limited by the following examples. The preferred embodiments of this invention are illustrated by those tests having the highest values in tensile strength and compressive strength.

In the examples, a comparison of certain properties of the bound aggregate is made to demonstrate the advance in the art accomplished by this invention. When tensile strength is used as the method of comparison, this test was conducted according to the standard described in Section 13 of the *Foundry Sand Handbook*, seventh edition, copyright 1963, by the American Foundry Society, Inc., Des Plaines, Ill. When compressive strength is used as a means of comparison, this test is conducted according to standard ASTM procedures.

Where toluene sulfonic acid is used as the catalyst herein, it comprises a 74 percent by weight solution of toluene sulfonic acid in water. Where phosphoric acid is used as the catalyst herein, it comprises an 80 percent solution of phosphoric acid in water. The urea-formaldehyde mixtures used in each of the tests were urea-formaldehyde 85 type mixtures. Unless otherwise indicated herein, the term "parts" refers to parts by weight.

EXAMPLE 1

A series of tests were conducted to illustrate the improvement achieved by this invention. In each of the tests the following procedure was followed:

First, a quantity of aggregate was weighed and set aside. Next, the monomeric binder composition was prepared by thoroughly admixing the stated ingredients in the amounts indicated, and an amount of the monomeric binder equal to the indicated percent by weight of the aggregate was weighed and set aside. Next, an amount of the acidic catalyst based on a percentage of weight of a binder as indicated was weighed and thoroughly mixed with the aggregate. After the aggregate and acidic catalyst were thoroughly mixed, the binder composition was added thereto and thoroughly mixed therein. Samples were prepared from each of these mixtures and allowed to cure 3 days before measurements were made on tensile strength and compressive strength. The results of the test are shown in Table I.

TABLE I

| Test No. | Binder Composition | | | Amount Binder % of Aggregate | Catalyst | | Tensile Strength (psi) | Compressive Strength (psi) |
|---|---|---|---|---|---|---|---|---|
| | Parts Furfuryl Alcohol | Parts Urea Formaldehyde Mixture | Parts Gamma-Amino-propyl-triethoxy-silane | | Type | Amount % of Binder | | |
| 1 | 92 | 8 | 0 | 8 | Toluene Sulfonic Acid | 20 | 431 | 3205 |
| 2 | 92 | 8 | 0.1 | 4 | do. | 20 | 774 | |
| 3 | 92 | 8 | 0.1 | 6 | do. | 20 | 558 | |
| 4 | 92 | 8 | 0.1 | 8 | do. | 20 | 1043 | 6090 |
| 5 | 92 | 8 | 0.1 | 10 | do. | 20 | 1169 | |
| 6 | 92 | 8 | 0.2 | 4 | do. | 20 | 949 | |
| 7 | 92 | 8 | 0.2 | 6 | do. | 20 | 1252 | |
| 8 | 92 | 8 | 0.2 | 8 | do. | 20 | 1330 | |
| 9 | 92 | 8 | 0.2 | 10 | do. | 20 | 1189 | |
| 10 | 92 | 8 | 0.5 | 4 | do. | 20 | 1175 | |
| 11 | 92 | 8 | 0.5 | 6 | do. | 20 | 1495 | |
| 12 | 92 | 8 | 0.5 | 8 | do. | 20 | 1458 | 6050 |
| 13 | 92 | 8 | 0.5 | 10 | do. | 20 | 1251 | |
| 14 | 96 | 4 | 0.3 | 8 | do. | 20 | 1669 | 5970 |
| 15 | 92 | 8 | 0.3 | 8 | $H_3PO_4$ | 23 | 1505 | 6218 |
| 16 | 100 | 0 | 0.1 | 8 | Toluene Sulfonic Acid | 20 | 1395 | 7330 |

The improvement of this invention is clearly shown by the data in the above table. In Test 1 the binder composition was comprised of furfuryl alcohol and a urea-formaldehyde mixture. The tensile strength and compressive strength values of these cores were 431 psi and 3,205 psi respectively.

Test 16 illustrates the improvement achieved by adding gamma-aminopropyltriethoxysilane to monomeric furfuryl alcohol as the binder. In such a case, the tensile strength increases to 1,395 psi and the compressive strength is increased to 7,330 psi.

Test 2 indicates the tremendous improvement achieved by the addition of the silane. When 0.1 part by weight of gamma-aminopropyltriethoxysilane was added to the furfuryl alcohol-urea-formaldehyde mixture, the tensile strength was shown to increase 70 percent even when only half as much binder was utilized. When the same amount of binder was utilized, as is illustrated by Test 4, the tensile strength was shown to increase over 130 percent and the compressive strength was shown to almost double. The other tests further illustrate the improvement achieved by this invention.

Test 14 particularly illustrates the improvement of this invention since the tensile strength is shown to have increased by about 270 percent over the sample prepared from the furfuryl alcohol urea-formaldehyde binder.

EXAMPLE 2

Following the procedure of Example 1, samples are prepared from the stated ingredients and in the amounts indicated in Table II.

TABLE II

| Test No. | Binder Composition | | | | Amount Binder % of Aggregate | Toluene Sulfonic Acid Catalyst % of Binder |
|---|---|---|---|---|---|---|
| | Parts Furfuryl Alcohol | Parts Urea Formaldehyde Mixture | Silane | | | |
| | | | Type | Parts | | |
| 17 | 92 | 8 | gamma-mercapto-propyltriethoxy-silane | 0.3 | 8 | 20 |
| 18 | 92 | 8 | gamma-aminopro-pyltrifurfuroxy-silane | 0.3 | 8 | 20 |

The improvement accomplished by this invention as evidenced by Example 1 is more apparent when compared to prior attempts to achieve the same results. For instance, with Portland cement prepared concrete it is possible to achieve a compressive strength of only about 5,000 psi and this is accomplished only after 28 days of cure.

An epoxy resin (EPON 828 resin and EPON Curing Agent T-1, Shell Oil Company, New York, N.Y. in a weight ratio of 4:1) used in an amount of 4 percent by weight epoxy resin was found to have a tensile strength of 375 psi and a compressive strength of 2,300 psi, both values being substantially below those accomplished by this invention.

For further comparison, aggregates were bound with a typical isophthalic polyester extended with styrene and catalyzed with 1 ¼ percent by weight methyl ethyl ketone peroxide. At binder levels of 4, 6, and 8 percent by weight the cured samples were found to have compressive strengths of 690 psi, 385 psi, and 3,070 psi respectively and tensile strengths of 230 psi, 425 psi, and 625 psi respectively. It is therefore clearly shown that the accomplishments of this invention far exceed those shown by prior art.

One additional feature of this invention is that the furfuryl alcohol monomer is resinified in situ in the building material rather than prior to the introduction into the aggregate. This one-step feature has an obvious commercial advantage.

The above examples clearly demonstrate that this invention has significantly advanced the building material art. Test 1 is not an embodiment of this invention, but is used merely for purposes of comparison.

Having fully described this new and novel invention, we claim:

1. A process for producing a bound aggregate building material composition consisting essentially of the steps of:
   a. forming a first mixture comprising a monomeric binder mixture of from 99.5 percent to 99.9875 percent by weight monomeric furfuryl alcohol, and from 0.5 percent to 0.0125 percent by weight of a silane coupling agent of the general formula:

$$X-R'-Si-(OR'')_3$$

wherein R' is a short chain alkylene containing between about 3 and 6 carbon atoms; R'' is a radical selected from the group consisting of aryl, alkyl, substituted aryl, and heteroalkyl; and X is a reactive member selected from the group consisting of amino, mercapto, epoxy, and glycidoxy;
   b. forming a second mixture comprising a mixture of aggregate and acidic catlyst, said aggregate and said acidic catlyst being mixed in a proportion such that when from 2 percent to 20 percent by weight of said first mixture is mixed with from 98 percent to 80 percent by weight of the aggregate-acidic catalyst mixture, the acidic catalyst is present in an amount of from 5 percent to 50 percent by weight of the monomeric binder; and
   c. admixing said first mixture and said second mixture in an amount such that the first mixture contributes from 2 percent to 20 percent by weight and said second mixture contributes from 98 percent to 80 percent by weight.

2. A process as in claim 1 wherein said first mixture includes from 2 percent to 10 percent by weight of aqueous urea-formaldehyde mixture and said aqueous urea-formaldehyde mixture contains from 5 percent to about 25 percent by weight water.

3. The process as in claim 1 in which said acidic catalyst is toluene sulfonic acid.

4. The process of claim 1 wherein said silane coupling agent is gamma-aminopropyltriethoxysilane.

5. The process of claim 1 wherein said silane coupling agent is gamma-mercaptopropyltrimethoxysilane.

6. The process of claim 1 wherein said silane coupling agent is N-beta-(aminoethyl)-gamma-aminopropyltrimethoxysilane.

7. The process of claim 1 wherein said silane coupling agent is beta-(3,4-epoxycyclohexyl)ethyltrimethoxysilane.

8. The process of claim 1 wherein said silane coupling agent is gamma-glycidoxypropyltrimethoxysilane.

9. The process of claim 1 wherein said silane coupling agent is gamma-aminopropyltriphenoxysilane.

10. The process of claim 1 wherein said silane coupling agent is gamma-aminopropyltribenzyloxysilane.

11. The process of claim 1 wherein said silane coupling agent is gamma-aminopropyltrifurfuroxysilane.

12. The process of claim 1 wherein said silane coupling agent is gamma-aminopropyltri(o-chlorophenoxy)silane.

13. The process of claim 1 wherein said silane coupling agent is gamma-aminopropyltri(p-chlorophenoxy)silane.

14. The process of claim 1 wherein said silane coupling agent is gamma-aminopropyltri(tetrahydrofurfuroxy)silane.

15. A process for producing a bound aggregate building material composition comprising the steps of:
   a. forming a first package comprising a monomeric binder mixture of from 99 ½ percent to 99 ⅞ percent by weight monomeric furfuryl alcohol and from ½ percent to ⅛ percent by weight of a silane coupling agent of the general formula:

$$X-R'-Si-(OR'')_3$$

wherein R' is a short chain alkylene containing between about 3 and 6 carbon atoms; R'' is a radical selected from the group consisting of aryl, alkyl, substituted aryl, and heteroalkyl; and X is a reactive member selected from the group consisting of amino, mercapto, epoxy, and glycidoxy;
   b. forming a second package comprising a mixture of aggregate and acidic catalyst, said aggregate and said acidic catalyst being mixed in a proportion such that when from 2 percent to 20 percent by weight monomeric binder is mixed with from 98 percent to 80 percent by weight of the aggregate-acidic catalyst mixture, the acidic catalyst is present in an amount of from 5 percent to 50 percent by weight of the monomeric binder; and
   c. admixing said first package and said second package in an amount such that the first package contributes from 2 percent to 20 percent by weight and said second package contributes from 98 percent to 80 percent by weight.

16. A process of producing a bound aggregate building material composition comprising the steps of:
   a. forming a first package consisting essentially of a monomeric binder mixture of from 99 ½ percent to 99 ⅞ percent by weight monomeric furfuryl alcohol and from ½ percent to ⅛ percent by weight of a silane coupling agent of the general formula:

$$X-R'-Si-(OR'')_3$$

wherein R' is a short chain alkylene containing between about 3 and 6 carbon atoms; R'' is a radical selected from the group consisting of aryl, alkyl, substituted aryl, and heteroalkyl; and X is a reactive member selected from the group consisting of amino, mercapto, epoxy, and glycidoxy;
   b. forming a second package consisting essentially of a mixture of aggregate and acidic catalyst, said aggregate and said acidic catalyst being mixed in a proportion such that when from 2 percent to 20 percent by weight monomeric binder is mixed with from 98 percent to 80 percent by weight of the aggregate-acidic catalyst mixture, the acidic catalyst is present in an amount of from 5 percent to 50 percent by weight of the monomeric binder; and c. admixing said first package and said second package in an amount such that the first package contributes from 2 percent to 20 percent by weight and said second package contributes from 98 percent to 80 percent by weight.

* * * * *